United States Patent
Fall et al.

(10) Patent No.: US 7,528,773 B2
(45) Date of Patent: May 5, 2009

(54) SATELLITE BEACON FOR FASTER SKY-SEARCH AND POINTING ERROR IDENTIFICATION

(75) Inventors: Terrence L. Fall, Thousand Oaks, CA (US); Frank J. Hules, Calabasas, CA (US)

(73) Assignee: Delphi Technologies, Inc., Troy, MI (US)

( * ) Notice: Subject to any disclaimer, the term of this patent is extended or adjusted under 35 U.S.C. 154(b) by 732 days.

(21) Appl. No.: 11/166,486

(22) Filed: Jun. 24, 2005

(65) Prior Publication Data

US 2006/0292981 A1 Dec. 28, 2006

(51) Int. Cl.
*H01Q 3/00* (2006.01)
(52) U.S. Cl. ...................................... 342/359
(58) Field of Classification Search ......... 342/359–360, 342/354
See application file for complete search history.

(56) References Cited

U.S. PATENT DOCUMENTS

| | | | |
|---|---|---|---|
| 6,016,120 A | 1/2000 | McNabb et al. | |
| 6,023,242 A | 2/2000 | Dixon et al. | |
| 6,049,306 A | 4/2000 | Amarillas | |
| 6,292,759 B1 | 9/2001 | Schiffmann | |
| 6,661,373 B1 | 12/2003 | Holliday | |

FOREIGN PATENT DOCUMENTS

| | | |
|---|---|---|
| CA | 2326355 | 5/2001 |
| EP | 1 100 146 | 5/2001 |
| WO | 99/34475 | 7/1999 |

OTHER PUBLICATIONS

U.S. Appl. No. 11/079,706, filed Mar. 14, 2005, Fall.
European Search Report dated May 21, 2008.
European Search Report dated Sep. 20, 2006.
Communication from European Patent Office for European Application No. 06076241.6-2220, Aug. 6, 2007 (8 pages).

*Primary Examiner*—Thomas H Tarcza
*Assistant Examiner*—Fred H Mull
(74) *Attorney, Agent, or Firm*—Jimmy L. Funke (57) ABSTRACT

An apparatus for determining the identity of a first detected satellite and to determine a second scan position for a satellite of interest based in part on the identity of the first detected satellite is disclosed. In one example the identity of the first detected satellite may be determined based on a satellite beacon or identifier.

16 Claims, 6 Drawing Sheets

SATELLITE BEACON FOR FASTER SKY-SEARCH AND POINTING ERROR IDENTIFICATION

TECHNICAL BACKGROUND

The present invention relates to systems and methods to locate and/or identify satellites and in particular systems and methods to locate and/or identify satellites relative to a mobile receiver.

BACKGROUND OF THE INVENTION

Geo-stationary satellites are positioned generally directly above the equator of the Earth and stay generally fixed in position relative to the Earth as the Earth rotates. Each of these satellites typically have multiple transponders, each transponder having multiple data channels. In one example, a satellite might have thirty-two transponders, each transponder having about six or more data channels. A satellite spectra for a satellite is provided based on which transponders are used and the manner in which each transponder is used.

These geo-stationary satellites are generally spaced apart, such as a first satellite may be at 85° west longitude, a second satellite may be at 101° west longitude, and a third satellite may be at 110° west longitude. Further, although the various geo-stationary satellites are generally in the same orbit, the various satellites may appear to be at various heights above the Earth relative to a base unit having a positionable antenna on the Earth. As such, for a given satellite, a base unit on the ground will need to know the azimuth angle and the elevation angle that the respective satellite makes with the location of the base unit on the ground in order to properly position the antenna of the base unit. Various procedures for calculating the azimuth angle and the elevation angle for an antenna of a base unit given the longitude and latitude of the satellite and the longitude and latitude of the base unit are well known.

Various methods and apparatus have been employed to allow a positionable antenna of a mobile base unit to track a satellite, such as an antenna mounted to a vehicle. One such apparatus is a hybrid tracking system which includes a receiver configured to decode signals received by the antenna, a vehicle attitude measurement component, and a satellite pointing error feedback component. Vehicle attitude measurement component is configured to derive a heading of the vehicle. Vehicle attitude measurement component is usually some form of Inertial Measurement Unit (IMU) which may include a magnetic pointing device. Satellite pointing error feedback component is configured to signal amplitude variation indicative of the pointing error. In order to derive pointing error, some method of dithering may be employed. As such, satellite pointing error feedback assists in positioning the antenna so that the maximum data signal is received from the satellite. The satellite pointing error feedback component typically employs all electronic beam steering of the antenna, all mechanical beam steering of the antenna, or a combination of electronic beam steering and mechanical beam steering of the antenna.

A problem with conventional tracking systems is the initial acquisition of a satellite of interest out of a plurality of possible satellites and/or the reacquisition of a satellite of interest following a period of time that the signal from the satellite of interest has been blocked. Such blockages may occur frequently in the automotive environment. Acquisition of one of these geo-stationary satellites is typically a time consuming process especially for mobile receivers whose Earth bound position and/or heading is likely to change.

The normal method used for satellite acquisition with mobile tracking systems is a sweep or scan of the sky and the detection of a signal in the expected frequency band. The area that must be scanned may be quite large due to a lack of knowledge of the current position of the vehicle and/or a lack of knowledge of the vehicle heading. Once a signal of the appropriate frequency is detected with the antenna, the receiver attempts to decode or descramble the data stream being transmitted by the satellite. Decoding of the data stream may take up to several seconds depending on the quality of the signal from the satellite at first detection.

Further, if the receiver fails in decoding the data stream then the satellite is deemed to not correspond to the satellite of interest and the sky is once again swept for the satellite of interest. Often times the same portion of the sky is re-swept because of a lack of knowledge of the current location and/or heading of the vehicle.

The use of signal strength alone also does not provide an adequate method for locating a satellite because many satellites have relatively strong signal strengths. Once again the determination that the incorrect satellite has been detected is only discovered after a lengthy failure to decode or descramble the satellite's data stream.

SUMMARY OF THE INVENTION

In an exemplary embodiment, a system is provided for quickly identifying a detected satellite to determine if the detected satellite corresponds to a satellite of interest. In an example, the system uses a unique beacon or identifier for each satellite which may be quickly analyzed to determine the identity of the detected satellite. In another exemplary embodiment, a system is provided which upon the detection of a satellite which is not the satellite of interest, the system utilizes information about the detected satellite to determine a new scan location which generally corresponds to the satellite of interest.

In a further exemplary embodiment, a method for locating a satellite of interest out of a plurality of satellites is provided. The method comprising the steps of: scanning the sky with an antenna; detecting a first satellite at a first scan location of the antenna; and determining a second scan location of the antenna based on an identification of the first satellite. In one example, the step of determining a second scan location of the antenna based on an identification of the first satellite comprises the steps of: storing location information and an associated unique identifier for each satellite of the plurality of satellites; determining a detected identifier associated with the first satellite; determining based on the stored location information a spatial relationship between the first satellite and the satellite of interest; and providing a second scan location based on the spatial relationship between the first satellite and the satellite of interest.

In yet another exemplary embodiment, an apparatus for locating a satellite of interest from a plurality of satellites, wherein each of the plurality of satellites is recognizable by a unique satellite identifier, is provided. The apparatus comprising: an antenna configured to scan the sky and to detect a first unique satellite identifier from a first satellite of the plurality of satellites when the antenna is in a first scan position; and a controller configured to determine an identity of the first satellite based on the detected unique satellite identifier and to determine a second scan position for the antenna based on the identity of the first satellite. In one example, the apparatus further comprises a locator configured to provide location information about the apparatus, wherein the second scan position for the antenna is determined based on the location of the apparatus and a spatial relationship between the first satellite and the satellite of interest, the second scan position generally corresponding to an alignment of the antenna with the satellite of interest.

In still a further exemplary embodiment, a method for locating a satellite of interest out of a plurality of satellites, each of the satellites having an associated unique satellite identifier and a data signal is provided. The method comprising the steps of: detecting a first satellite at a first scan location of an antenna; and identifying the first satellite as not being the satellite of interest based on a first unique satellite identifier detected by the antenna, the first unique satellite identifier being recognizable without an attempt to completely decode a first data signal detected by the antenna. In one example, the first unique satellite identifier is contained in a beacon signal detected by the antenna which is distinct from the first data signal. In another example, the first unique satellite identifier is recognizable from the first data signal. In a further example, the first unique identifier for the first satellite varies depending on the location of the antenna. In still a further example, the first unique identifier for the first satellite is a spectral signature of the first satellite.

In still another exemplary embodiment, an apparatus for locating a satellite of interest out of a plurality of satellites, each of the satellites having an associated unique satellite identifier and a data signal is provided. The apparatus comprising: an antenna for detecting a first satellite at a first scan location of an antenna; a positioning member operably coupled to the antenna, the positioning member being configured to orient the antenna; and a controller operably coupled to the antenna and the positioning member, the controller configured to identify the first satellite as not being the satellite of interest based on a first unique satellite identifier detected by the antenna, the first unique satellite identifier being recognizable without an attempt to completely decode a first data signal detected by the antenna. In one example, the first unique satellite identifier is contained in a beacon signal detected by the antenna which is distinct from the first data signal. In another example, the first unique satellite identifier is recognizable from the first data signal. In a further example, the first unique identifier for the first satellite varies depending on the location of the antenna. In still another example, the first unique identifier for the first satellite is a spectral signature of the first satellite.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments discussed below are not intended to be exhaustive or limit the invention to the precise forms disclosed in the following detailed description. Rather, the embodiments are chosen and described so that others skilled in the art may utilize their teachings.

Figure 1:
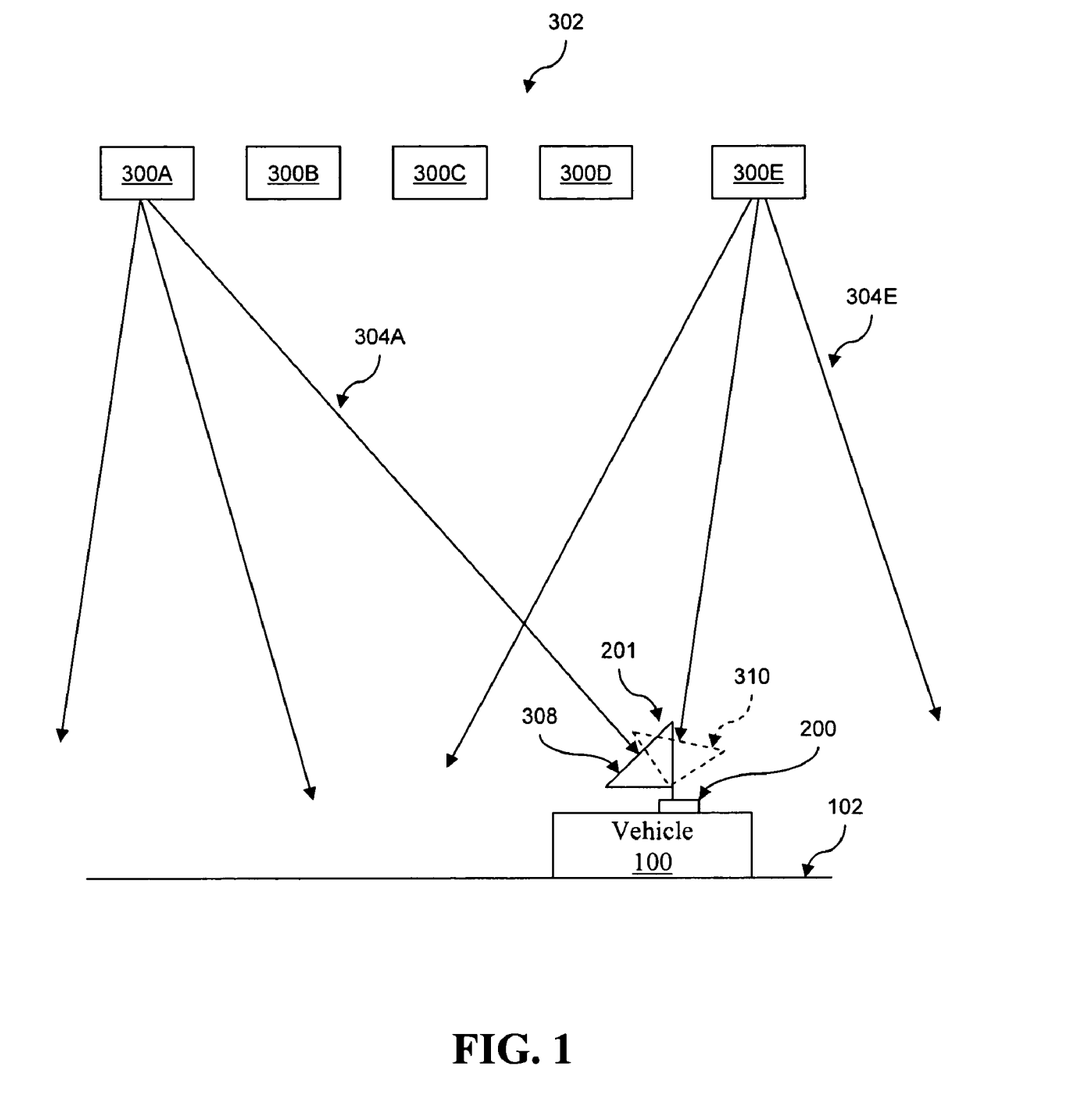
FIG. 1 provides a representation of a vehicle having a base unit which includes an antenna that is positionable to receive one or more signals from a given satellite.

Referring to FIG. 1, a vehicle 100 is shown with a base unit 200 mounted or otherwise coupled thereto. Base unit 200 is positionable such that an antenna 201 of base unit 200 is able to scan the sky in order to locate and receive data from a satellite of interest 300E which is one of a plurality of satellites 302, illustratively shown as satellites 300A, 300B, 300C, 300D, and 300E. As is well known in the art, each satellite 300 is capable of generating one or more signals which are broadcast in multiple directions for reception by an antenna and decoding by a receiver, such as antenna 201 and receiver 202 of base unit 200. As illustratively shown in FIG. 1 signals 304A and 304E for respective satellites 300A and 300E are receivable by antenna 201. Further, satellites 300A, 300B, 300C, 300D, and 300E remain generally fixed in space relative to each other and relative to a surface 102 of the planet, such as Earth.

Figure 2:
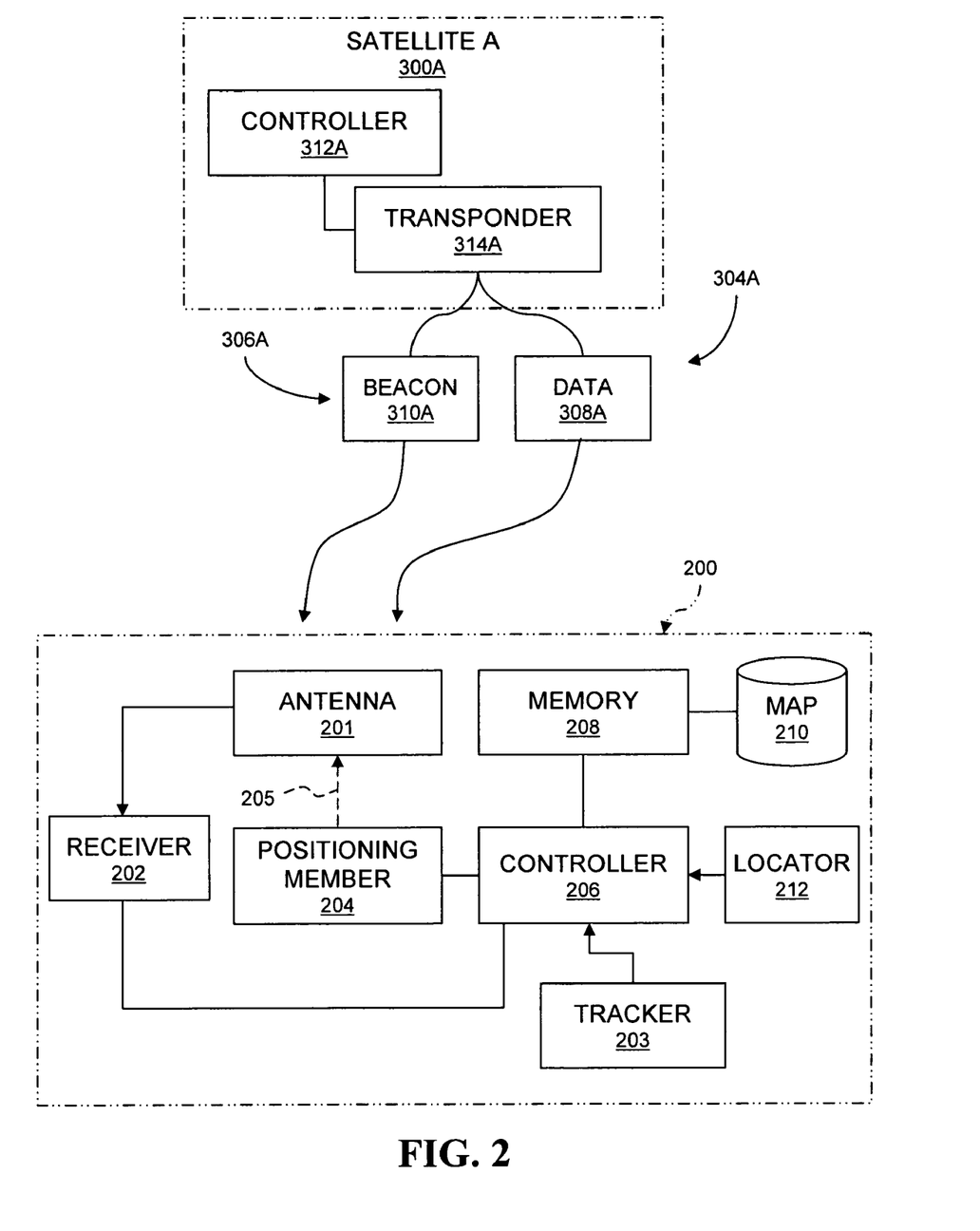
FIG. 2 provides a representation of an illustrative embodiment of a base unit receiving an illustrative signal from an illustrative embodiment of a satellite, the signal including a unique satellite beacon or identifier.

Further, as is well known in the art vehicle 100 is configured to move relative to surface 102 of the planet while tracking a satellite of interest. As such, once a satellite of interest has been located, it is well known how to maintain connection to the satellite as the vehicle is moving across surface 102. Referring to FIG. 2, base unit 200 includes a tracker 203 to maintain connection to a given satellite 300. Example techniques of maintaining connection to the respective satellite 300 include (1) the use of a vehicle attitude measurement component (such as discussed herein) from which base unit 200 is able to correct a pointing angle of antenna 201 for changes in the attitude of vehicle 100 and (2) the use of a satellite pointing error feedback component (such as discussed herein). In a one embodiment, base unit 200 maintains connection to the respective satellite 300 by a blended use of a vehicle attitude measurement component and a satellite pointing error feedback component, such as disclosed in U.S. patent application Ser. No. 11/079,706 filed Mar. 14, 2005, titled "Vehicle Mounted Satellite Tracking System," the disclosure of which is expressly incorporated by reference herein.

In one embodiment, illustratively shown in FIG. 2, the plurality of satellites 302, illustratively satellite 300A, each generate a unique beacon 306 (such as with transponders 314A), illustratively beacon 306A, associated with the respective satellite. Satellite 300A includes a controller 312A and a plurality of transponder, such as transponder 314A. Transponder 314A further transmit signal 304A for reception by antennas, such as antenna 201 of base unit 200 and subsequent decoding by associated receiver, such as receiver 202 of base unit 200. Controller 312A controls the signals which are generated and transmitted by transponder 314A (as well as the additional transponders of satellite 300). As discussed herein, each satellite typically includes multiple transponders which are transmitting one or more data signals. As such, signal 304A is typically a collection of multiple data signals from multiple transponders, one or more of which are of interest to base unit 200 at a given time.

Beacon 306A provides a mechanism for quickly identifying satellite 300A without having to decode or attempt to decode the complete data signal emitted by satellite 300A. Many various implementations of beacon 306 are disclosed herein. Each type of beacon 306 provides a unique identifier for each satellite 300 in the group of satellites 302. In one embodiment, each of satellites 300 are characterized as having a respective beacon 306. In another embodiment, a subset of the plurality of satellites 302 are each characterized as having a respective beacon 306. In yet another embodiment, each satellite 300 in the group of satellites 302 has a respective beacon 306, but at least two of the satellites 300 have beacons 306 of different implementations.

As shown in FIG. 2, signal 304A includes a data signal 308A (as explained herein data signal 308A is typically a plurality of data signals) and a separate beacon signal 310A. In one embodiment, data signal 308A includes one or more video signals and/or audio signals. In one example, data signal 308A includes a plurality of digitally modulated signals multiplexed on one or more transponder frequencies, conforming to the Moving Pictures Experts Group-2 (MPEG-2) coded TV service or that of a similar standard. Beacon signal 310A includes a unique identifier which uniquely identifies satellite 300A relative to the remaining satellites 300B-300E.

In one embodiment, beacon signal 310A is one or more simple carrier frequencies wherein each satellite 300 has a corresponding carrier frequency which is distinct from the remaining satellites 300, such that each satellite 300 may be uniquely identified. The various carrier frequencies being at one or more frequencies that may be received and understood by base unit 200. As such, beacon or identifier 306 is the frequency of the carrier signal.

In another embodiment, beacon signal 310A is a fixed carrier signal for all of the respective satellites 300A-300E. Each satellite 300A-300E modulates a simple code, such as an eight bit digital code, on the fixed carrier signal. Exemplary methods of modulating a simple code on a fixed carrier frequency may include Quaternary Phase Shift Keying (QPSK), Differential Phase Shift Keying (DPSK), Frequency Shift Keying (FSK), and On Off Keying (OOK) and other suitable methods of modulating a simple code on a fixed carrier frequency. The eight bit code provides unique identifiers for up to 256 satellites. Other length codes may be used if fewer or additional satellites are provided. The fixed carrier frequency being at a frequency that may be received and understood by base unit 200. As such, beacon or identifier 306 is the code, such as an eight bit code, modulated on the carrier signal.

In a further embodiment, within the satellites' (300A-300E) shared frequency band, beacon 306 is a spectral signature associated with the respective satellite 300 which is unique to the respective satellite 300. The spectral signature of a satellite 300 may be observed without decoding data signal 308A. In one embodiment, satellites 300 each broadcast over a plurality of different transponders. In such an embodiment, a spectral signature may result from a satellite having holes in its transponder frequency spacing, a satellite not fully utilizing the capacity of a given transponder, and/or if one or more transponders are being dedicated to spot beams and are consequently manifesting stronger signal levels at the corresponding frequencies. In one embodiment, beacon 306 is the entire spectral signature. In another embodiment, beacon 306 is a portion of the spectral signature, such as one or more aspects of a spectral signature. In one example, transponder #12 of satellite 300A generally appears to be transmitting at a signal strength about 3 decibels (dB) stronger than transponder #14 of satellite 300A. This characteristic is unique to satellite 300A (as least to satellite's 300A closest neighbors) and as such may be used as beacon or identifier 306. In one embodiment, receiver 202 uses a simple comb filter that would evaluate to true if the filter matched the detected spectral signature.

In yet another embodiment, beacon signal 310A is a component of data signal 308A. In one example beacon signal 310A is a header or label on the bit stream of data signal 308A. Base unit 200, in this embodiment does not have to decode or attempt to decode the entire data signal 308A, but rather only has to decode the header related to beacon signal 310A. The header provides a unique identifier for the respective satellite, such as a simple code. As such, beacon or identifier 306 is the code contained in the component of data signal 308A, such as a header or a label.

In still a further embodiment, beacon 306 relates to a recognizable characteristic of a given satellite. The signals generated by a given satellite have different characteristics based on the portion of surface 102 that vehicle 100 is positioned. For instance, signal 304A of satellite 300A may have different characteristics when received by base unit 200 when vehicle 100 is in Los Angeles, Calif. compared to when vehicle 100 is in New York, N.Y. due to the location of satellite 300A relative to Los Angeles, Calif. and New York, N.Y. By storing the characteristics of each satellite 300 as a function of vehicle location, the identity of a given satellite may be determined from the received satellite characteristics. An advantage of this approach is that the signals produced by satellites 300 do not need to contain a unique identifier therein, but rather the characteristic of the satellite, such as the spectral signature, provides an indication of the identity of the satellite to base unit 200.

In one embodiment the spectral signature of a satellite provides the recognizable characteristic of the satellite. In one example, satellite 300A exhibits a spectral signature, a portion thereof being that the signal from transponder #12 appears to be about 3 decibels (dB) stronger than the signal from transponder #14 when vehicle 100 is proximate to Los Angeles, Calif. This may be because transponder #12 has a spot beam directed at Los Angeles, Calif. to provide the local TV channels. The creation of a spot beam involves a reduction in the satellite's terrestrial coverage, such that as in this example a base unit 200 located in New York, N.Y. will detect little or no signal from transponder #12. This reduction or absence of signal from transponder #12 in New York, N.Y. may be used to identify and to distinguish satellite 300A from the remaining satellites 300B-300E, or at least from satellites proximate to satellite 300A. In one embodiment, this recognizable characteristic of the satellite is stored in memory 208 of base unit 200 or otherwise made available to base unit 200. For instance, this recognizable characteristic may be stored in map 210. As such, by knowing a general location of vehicle 100, such as with locator 212, base unit 200 may determine based on the recognizable characteristics stored in memory 208 the recognizable characteristic of satellite 300A for the current location of vehicle 100. In one embodiment, base unit 200 has a self-learning capability. In one example, after identifying a satellite of interest (either by a beacon or by the traditional method of decoding the data stream), such as satellite 300A, base unit 200 tracks satellite 300A. As satellite 300A is tracked, changes in its spectral signature are monitored. These changes may be compared to stored spectral signature information and/or may be stored to provide spectral signature information for the given locality of vehicle 100. This verified or updated spectral signature information may be used by base unit 200 (as a beacon or identifier) in subsequent attempts to locate satellite 300A.

In yet a further embodiment, one or more of the above beacons or identifiers are combinable to produce a beacon or identifier 306. This provides a redundancy check. In still a further embodiment, a first subset of satellites 300 includes a first beacon type, such as a separate signal at a distinct carrier frequency, and a second subset of satellites 300 includes a second beacon type, such as a simple code modulated on a fixed or common carrier frequency. The beacons 306 associated with each of satellites 300A-300E are stored in memory 208 of the base unit 200 or otherwise made available to base unit 200. In the illustrated embodiment, beacons 306 associated with each of satellites 300A-300E are stored in map 210. In one embodiment, beacons 306 are stored in memory 208, such as in map 210, at the time of manufacture of base unit 200. In another embodiment, beacons 306 are acquired and/or updated over the operational lifetime of base unit 200.

Referring to FIG. 2, base unit 200 includes an antenna 201 which is capable of receiving signal 304 from satellites 300, and a receiver 202 which is capable of decoding signal 304 received by antenna 201 from satellite 300, illustratively signal 304A when antenna 201 is aligned with satellite 300A. Antenna 201 may be a flat antenna and may include a waveguide.

Antenna 201 is positioned by a positioning member 204. Exemplary positioning members include a mechanical system, such as a mechanically gimballed platform upon which antenna 201 is mounted, or an electrical system such as one or more electronic circuits implemented within base unit 200 which electronically predisposes antenna 201 to receive the satellite signal from a specified direction, or a combination of a mechanical system and an electrical system. Positioning member 204 points antenna 201 in a desired direction, such as at satellite 300A to thereby improve the reception by antenna 201 of signal 304 transmitted by satellite 300A. The control of the pointing direction of antenna 201 (an azimuth angle of antenna 201 and an elevation angle of antenna 201) by positioning member 204 is indicated by dashed arrow 205.

Positioning member 204 is controlled by a controller 206. Controller 206 controls the pointing direction of antenna 201 with positioning member 204. Controller 206 is further operably coupled to receiver 202 and as explained herein determines the identity of the satellite currently identified by receiver 202 based on the beacon or identifier 306 of the satellite and, if necessary, redirects antenna 201 to a second pointing direction if the identity of the currently identified satellite does not correspond to the satellite of interest, the satellite for which base unit 200 is searching.

In one embodiment, controller 206 includes a processor which is programmable with software that is contained in a memory 208. Memory 208 further includes a map database 210 which provides a map 220 of satellite location information and the corresponding unique satellite beacon 306. As explained herein, controller 206 uses the information in map 220 to determine if the satellite of interest has been located or to determine a new scan position for antenna 201 if the satellite of interest has not been located.

Figure 3:
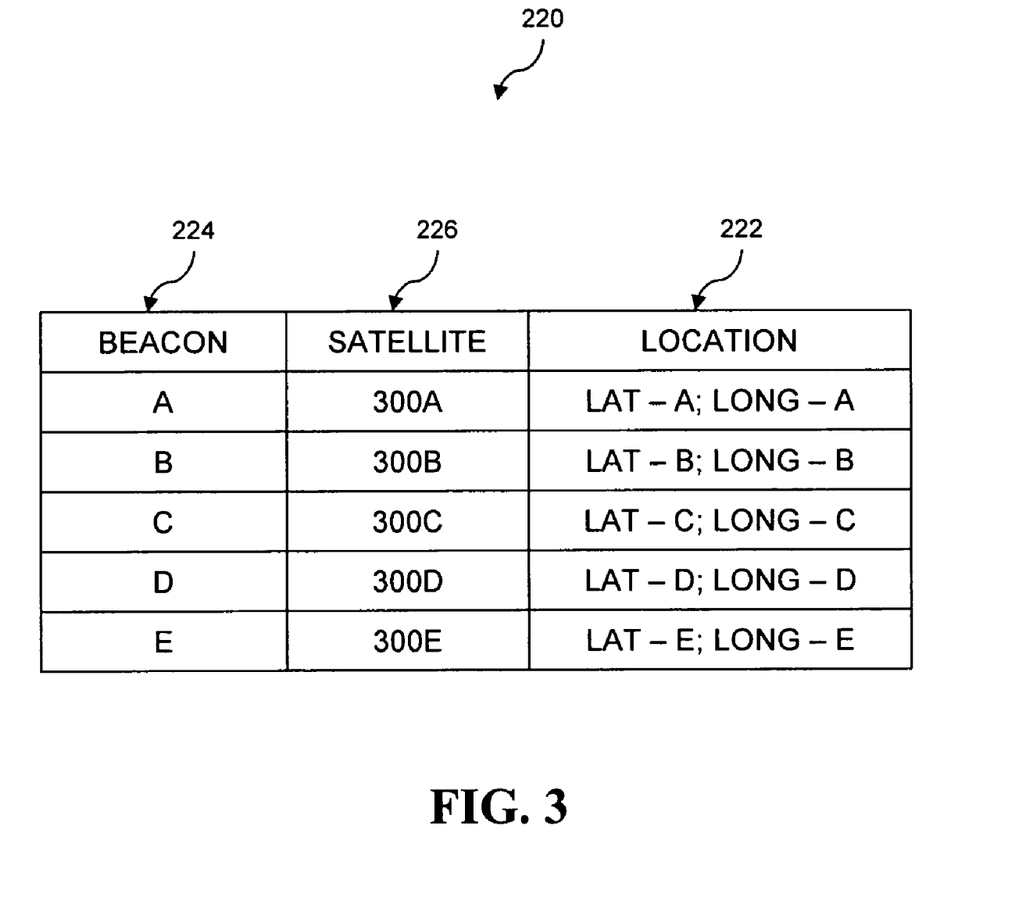
FIG. 3 provides a representation of an illustrative embodiment of a map contained in a map database of the base unit of FIG. 2.

Referring to FIG. 3, map 220 illustratively includes a location 222 for each satellite correlated with a listed beacon 224 for each satellite. Listed beacon or identifier 224 for a given satellite 300 corresponds to beacon or identifier 306 (as explained herein beacon 306 may be actively generated or derived from the characteristics of the data signals generated by the given satellite). Map 220, in one embodiment, may include additional information, illustratively such as a satellite name 226.

Having map 220 provides at least two benefits. First, by utilizing beacon 224, controller 206 may quickly determine if the satellite of interest has been found. Second, if the currently detected satellite does not correspond to the satellite of interest, the location information 222 may be used to calculate a new pointing direction for antenna 201.

Figure 4:
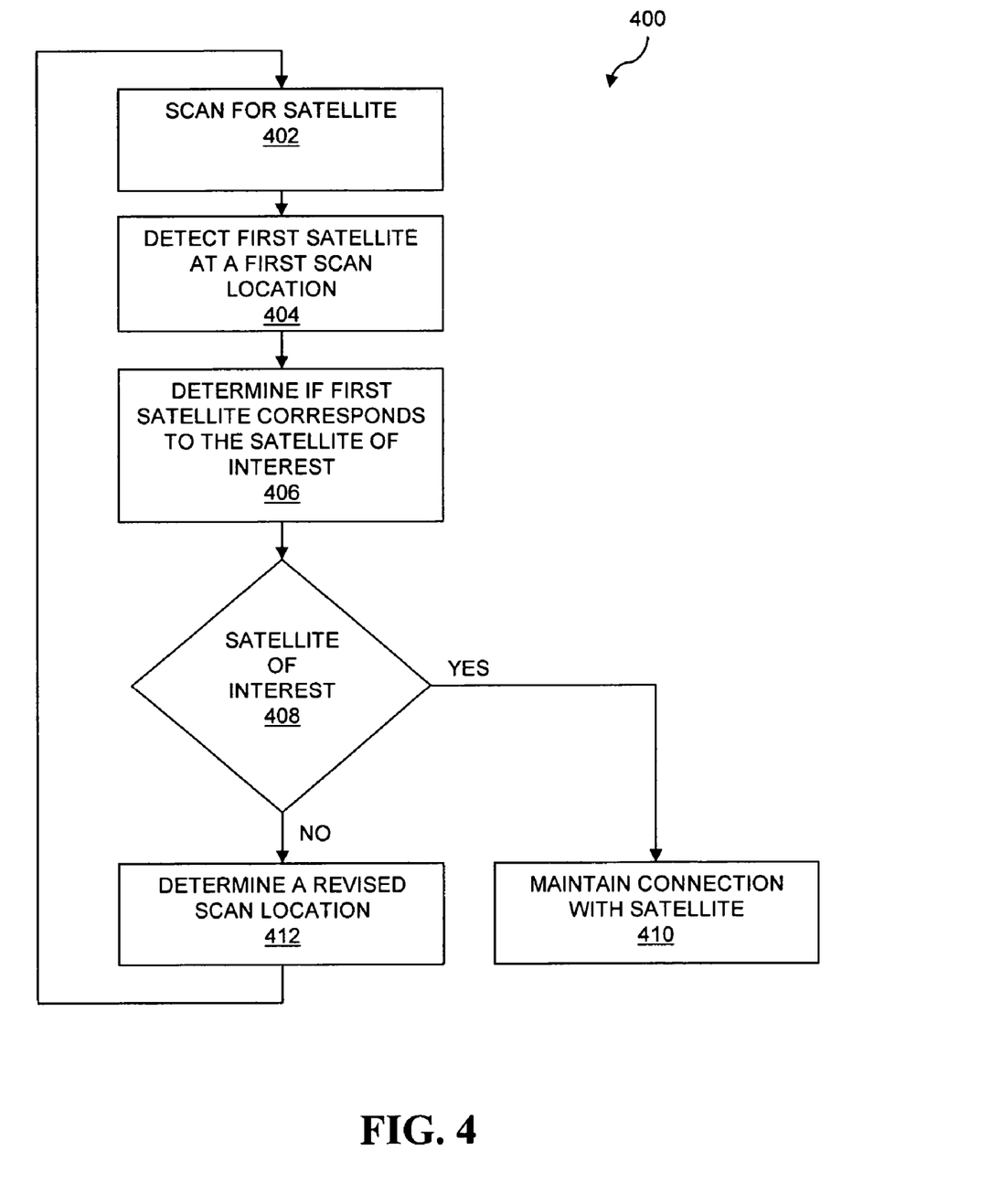
FIG. 4 provides an illustrative method of locating a satellite of interest with the base unit of FIG. 2.

An illustrative method of locating a satellite of interest from among a plurality of satellites 302 is shown in FIG. 4 and is explained with reference to FIG. 1. Referring to FIG. 1, the satellite of interest for this example is satellite 300E. As represented by block 402 in FIG. 4, controller 206 scans antenna 201 until a first satellite is detected by antenna 201, as represented by block 404. In one embodiment, controller 206 chooses a first scan location or pointing direction for antenna 201 based on an expected location of satellite 300E. In one example, base unit 200 includes a locator 212, such as a GPS location system or other suitable location systems, which provides a current location of vehicle 100 and a tracker 203, such as an Inertial Measurement Unit (IMU) or other suitable attitude systems, which provides a current attitude of the vehicle 100. Additionally, memory 208 provides a map 220 of location information about the satellites, including the satellite of interest. With these inputs (the location of vehicle 100, an attitude of vehicle 100, and location information about the satellite of interest) and the program software provided in memory 208, controller 206 of base unit 200 computes an initial scan location for antenna 201 which is implemented through positioning member 204. As antenna 201 scans the sky, antenna 201 receives signal 304A from satellite 300A when antenna 201 is oriented in a first position 308, as represented by block 404 in FIG. 4.

Based on the decoding of signal 304A by receiver 202, controller 206 determines whether signal 304A corresponds to the satellite of interest, in this example satellite 300E, or another satellite, as represented by block 406. If signal 304A corresponds to the satellite of interest 300E then controller 206 functions to maintain the connection with the satellite of interest 300E, the reception of signal 304A, as represented by blocks 408 and 410 (a tracking mode). Exemplary methods of tracking a satellite is disclosed in patent application Ser. No. 11/079,706, the disclosure of which has been expressly incorporated by reference herein. If signal 304A does not correspond to the satellite of interest 300E then controller 206 determines a revised scan location for antenna 201, as represented by block 412. Antenna 201 once again scans for the satellite of interest 300E using the revised scan location, as represented by block 402 (a locate mode).

Figure 5:
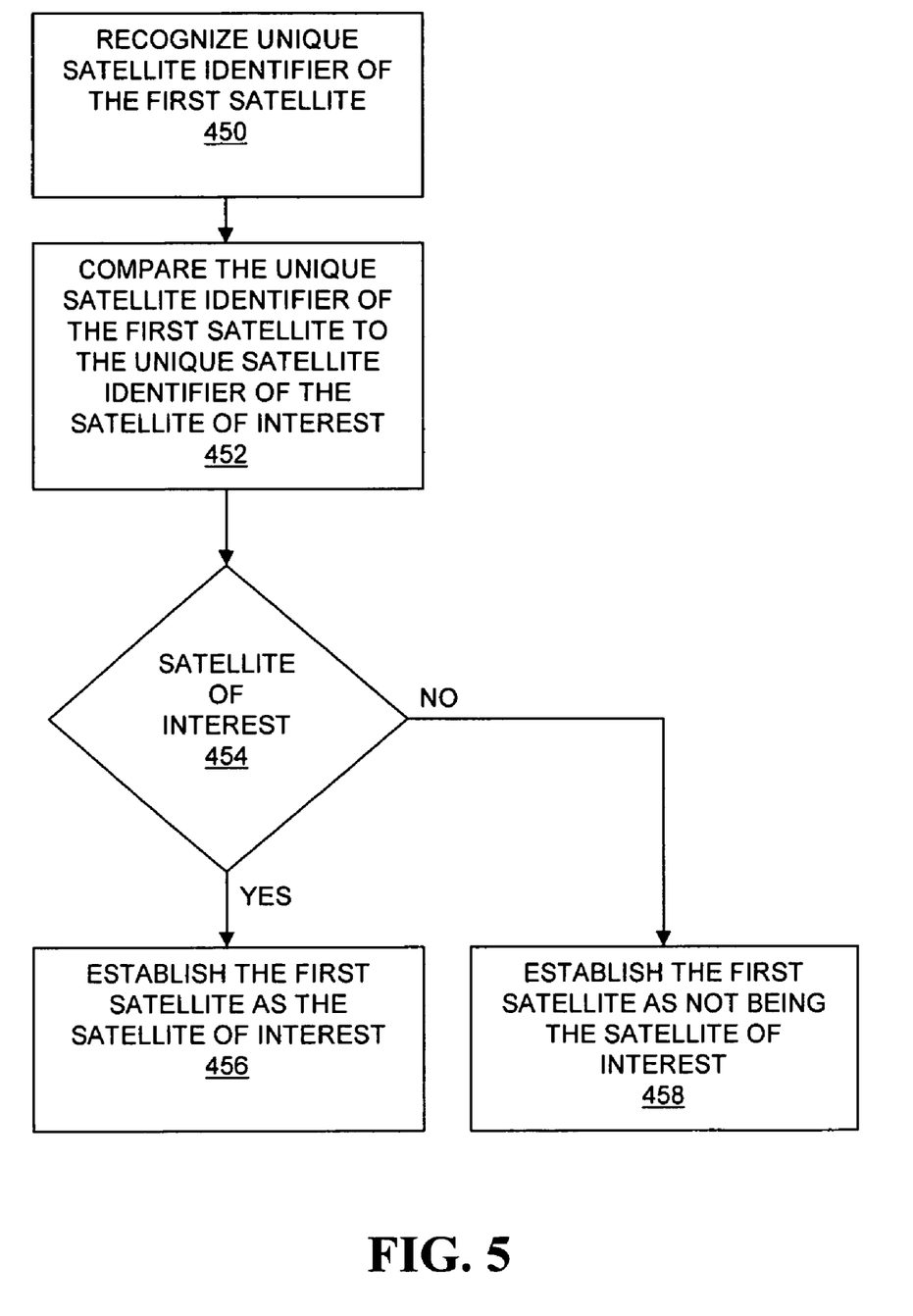
FIG. 5 provides an illustrative method of determining if a detected satellite corresponds to the satellite of interest.

Referring to FIG. 5, one illustrative method of determining whether signal 304A corresponds to the satellite of interest is shown. As represented by block 450, controller 206 recognizes or determines the beacon or identifier 306A associated with signal 304A. As stated herein, exemplary beacons 306 include a characteristic of a separate beacon signal 310, a characteristic of a data signal 308, such as a header, and/or a characteristic of signal 304 determined based on the location of vehicle 100. Preferably beacon 306A is one of a characteristic of a separate beacon signal 310A or a characteristic of a data signal 308A. In each case beacon 306 should be identifiable without the need to attempt to decode the complete data signal 308 of signal 304.

The recognized beacon or identifier 306A is then compared to the expected beacon or identifier 224 for the satellite of interest 300E, as represented by block 452. In one illustrative example, the recognized beacon or identifier 306A, having a value of "A" (see FIG. 3) is compared to a stored beacon value 224 of "E" (see FIG. 3) for satellite of interest 300E. If the two beacon values were the same, signal 304A would be established as having been associated with the satellite of interest 300E, as represented by block 456. In such a situation, the complete data stream for signal 304A would be decoded. However, in the example given the two beacon values, "A" and "E", are not the same, so signal 304A is established as not being associated with the satellite of interest 300E, as represented by block 458.

Figure 6:
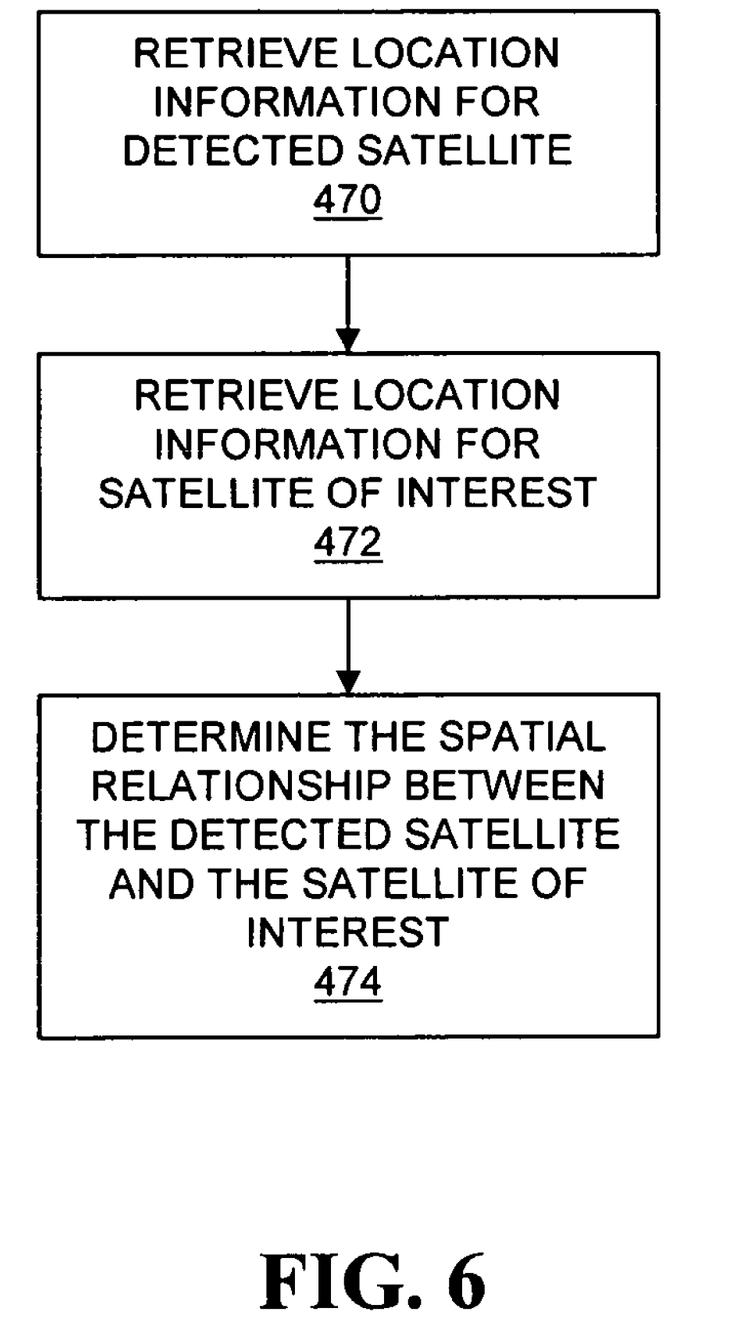
FIG. 6 provides an illustrative method of determining a revised scan position for the antenna of the base unit of FIG. 2.

Returning to FIG. 4, since signal 304A has been established as not being associated with the satellite of interest (satellite 300E), controller 206 determines a revised scan location 310 for antenna 201, as represented by block 412. An illustrative method for determining the revised scan location is shown in FIG. 6. The illustrative method in FIG. 6, assumes that a listing of satellite beacons 224 and respective satellite locations 222 is available to controller 206, such as by map 220 in FIG. 3.

Referring to FIG. 6, the location information of the satellite associated with the detected signal 304A, namely satellite 300A, and the satellite of interest, 300E, are retrieved, as represented by blocks 470 and 472. In one example, the location information of the satellite associated with the detected signal 304A, is stored in a database accessible by controller 206, such as map 220 in FIG. 3. Exemplary location information includes longitudinal location values and latitude values for each satellite 300. In one embodiment, this location information is used to determine azimuth angle information and elevation angle information for pointing the antenna at the detected satellite and the satellite of interest given the location of the vehicle. In another embodiment, this location information is used to determine azimuth angle information and elevation angle information for the pointing of the antenna at each satellite given the location of the vehicle.

Representative equations for the calculation of the azimuth angles and elevation angles from the earth position of vehicle 100 to any of satellites 300 are given below:

$$Az(\text{degrees}) = 180 + \text{sign}(\Delta long)\cos^{-1}\left(\frac{\tan(lat)}{\tan(\beta)}\right) \quad (1)$$

$$El(\text{degrees}) = \tan^{-1}\left[\frac{\cos(lat)\cos(\Delta long) - 0.151}{\sqrt{1 - \cos^3(lat)\cos^2(\Delta long)}}\right] \quad (2)$$

where
  $\beta = \cos^{-1}(\cos(lat)\cos(\Delta long))$
  lat=latitude of vehicle 100
  Δlong=the longitude of satellite 300–the longitude of vehicle 100
  sign=function that produces a +1 or −1 based on the sign of the argument.

It should be noted that these equations assume each satellite 300 is positioned at 0° latitude and that the azimuth and elevation angles are referenced to the earth's north, east and down directions. Azimuth is an angle measured from north in the north-to-east direction in the north-east plane. Elevation is an angle measured relative to the north-east plane in the minus (−) down direction. In a practical application the earth based azimuth and elevation angles for a respective satellite are converted by controller 206 to vehicle-referenced angles by well documented coordinate transformation techniques. This is accomplished by measuring the vehicle's attitude as angles relative to the earth's north, east, and down directions and by using these angles in the coordinate transformation. Changes in the attitude of the vehicle will result in modifications to azimuth angle information and elevation angle information used while pointing an antenna, such as antenna 201. As such, equations 1 and 2 may be rewritten as:

$$Az(\text{degrees}) = 180 + \text{sign}(\Delta long)\cos^{-1}\left(\frac{\tan(lat)}{\tan(\beta)}\right) + \Delta Az_{Vehicle} \quad (3)$$

$$El(\text{degrees}) = \tan^{-1}\left[\frac{\cos(lat)\cos(\Delta long) - 0.151}{\sqrt{1 - \cos^3(lat)\cos^2(\Delta long)}}\right] + \Delta El_{Vehicle} \quad (4)$$

where
  $\Delta Az_{Vehicle}$=azimuth adjustment based on the attitude of the vehicle, and
  $\Delta El_{Vehicle}$=elevation adjustment based on the attitude of the vehicle, and Next, a spatial relationship between the detected satellite, namely satellite 300A, and the satellite of interest, namely satellite 300E, is determined, as represented by block 474.

In one example, the spatial relationship is determined by a difference in the elevational angles to the satellite of interest and the detected satellite (ΔEl) and a difference in the azimuth angles to the satellite of interest and the detected satellite (ΔAz).

$$\Delta El = El_{300E} - El_{300A} \quad (5)$$

$$\Delta Az = Az_{300E} - Az_{300A} \quad (6)$$

By knowing the elevational angle difference and the azimuth angle difference, controller 206 is able to adjust the azimuth angle and/or to adjust the elevational angle of antenna 201. By reorienting antenna 201 as such, antenna 201 has a higher likelihood of detecting the satellite of interest, namely satellite 300E, on its next scan. In one embodiment, the attitude of vehicle 100 is not an issue because the attitude of vehicle 100 is assumed to be constant for the short time frame of determining a revised scan location. As such, equations (1) and (2) may be used as the inputs to equations (5) and (6).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for locating a satellite of interest out of a plurality of satellites at a scan location of a plurality of scan locations, the method comprising the steps of:
  scanning the sky with an antenna;
  detecting a first satellite at a first scan location of the antenna, wherein the first satellite is identified based upon a spectral signature of the first satellite, and the spectral signature is a result of the first satellite broadcasting over a plurality of transponders, such that the spectral signature is a function of a strength of a signal across the plurality of transponders; and determining a second scan location of the antenna based on an identification of the first satellite, where the second scan location corresponds to the location of the satellite of interest.

2. The method of claim 1, wherein the step of determining a second scan location of the antenna based on an identification of the first satellite comprises the steps of:
storing location information and an associated unique identifier for each satellite of the plurality of satellites;
determining a detected identifier associated with the first satellite;
determining based on the stored location information a spatial relationship between the first satellite and the satellite of interest; and
providing the second scan location based on the spatial relationship between the first satellite and the satellite of interest.

3. The method of claim 2, wherein the plurality of unique identifiers are stored in a memory associated with the antenna for comparison to the detected identifier associated with the first satellite.

4. The method of claim 2, wherein the step of determining a spatial relationship between the first satellite and the satellite of interest comprises the steps of:
determining based on the location of the antenna an azimuth offset between the first satellite and the satellite of interest and an elevation offset between the first satellite and the satellite of interest; and
determining a revised azimuth angle of the antenna based on the azimuth offset and a revised elevation angle of the antenna based on the elevation offset, the revised azimuth angle and the revised elevation angle corresponding to the second scan location.

5. The method of claim 2, wherein the unique identifier for the satellite of interest varies depending on the location of the antenna.

6. The method of claim 5, wherein variations in the unique identifier for the satellite of interest are learned by a controller associated with the antenna, the learning of variations in the unique identifier for the satellite of interest comprises the steps of:
storing a first spectral signature of the satellite of interest at a first location of the antenna;
moving the antenna to a second location spaced apart from the first location;
tracking the satellite of interest with the antenna as the antenna is moved from the first location to the second location; and
storing a second spectral signature of the satellite of interest at the second location of the antenna; and
associating the first spectral signature with the satellite of interest and the first location of the antenna and the second spectral signature with the satellite of interest and the second location of the antenna.

7. The method of claim 2, wherein the respective unique satellite identifier for each of the plurality of satellites is generated by the respective satellite in an identifier signal which is distinct from a data signal of the respective satellite.

8. The method of claim 2, wherein the respective unique satellite identifier for each of the plurality of satellites is generated by the respective satellite and is a component of a data signal of the respective satellite.

9. The method of claim 8, wherein the component is a code in a header of the data signal.

10. The method of claim 2, wherein the respective unique satellite identifier for each of the plurality of satellites is derived from a spectral signature of the respective satellite.

11. An apparatus for locating a satellite of interest from a plurality of satellites at a scan location of a plurality of scan locations, wherein each of the plurality of satellites is recognizable by a unique satellite identifier, the apparatus comprising:
an antenna configured to scan the sky and to detect a spectral signature of a first satellite of the plurality of satellites when the antenna is in a first scan position, wherein the spectral signature is a result of the first satellite broadcasting over a plurality of transponders, such that the spectral signature is a function of a strength of a signal across the plurality of transponders; and
a controller configured to determine an identity of the first satellite based on the detected spectral signature and to determine a second scan position for the antenna based on the identity of the first satellite, where the second scan location corresponds to the location of the satellite of interest.

12. The apparatus of claim 11, further comprising a locator configured to provide location information about the apparatus and wherein the second scan position for the antenna is determined based on the location of the apparatus and a spatial relationship between the first satellite and the satellite of interest, the second scan position generally corresponding to an alignment of the antenna with the satellite of interest.

13. The apparatus of claim 12, further comprising a memory operably coupled to the controller, the memory including a map having location information for the first satellite and the satellite of interest, the spatial relationship between the first satellite and the satellite of interest being based on the map.

14. The apparatus of claim 13, wherein the location information related to the first satellite includes a first longitudinal value and the location information related to the satellite of interest includes a second longitudinal value and the second scan position is based on an azimuth offset from the first scan position and an elevation offset from the first scan position, the azimuth offset being determined based on the location information of the apparatus and the first and second longitudinal values and the elevation offset being determined based on the location information of the apparatus and the first and second longitudinal values.

15. The apparatus of claim 11, wherein the spectral signature of the first satellite varies based on the location of the apparatus.

16. The apparatus of claim 15, further comprising a tracker and wherein the controller is further configured to track the satellite of interest once the satellite of interest has been detected, the controller storing a first spectral signature of the satellite of interest when the apparatus is in a first position and a second spectral signature of the satellite of interest when the apparatus is in a second position.

* * * * *